United States Patent [19]
Petz

[11] Patent Number: 5,061,148
[45] Date of Patent: Oct. 29, 1991

[54] POLAR CRANE MATERIAL HANDLING APPARATUS

[75] Inventor: David Petz, Tracy, Calif.

[73] Assignee: California Ammonia Co., Stockton, Calif.

[21] Appl. No.: 498,004

[22] Filed: Mar. 23, 1990

[51] Int. Cl.⁵ .......................... B66B 17/00; B65G 1/00; B65G 11/10
[52] U.S. Cl. .................................. 414/564; 414/266; 414/273; 212/226; 212/211
[58] Field of Search ............... 212/205, 210, 223, 225, 212/226, 228, 245, 211; 187/1 R, 7, 12; 52/29–30, 80–82, 89, 710, 747, 749; 414/281–283, 564, 266, 273; 104/236

[56] References Cited

U.S. PATENT DOCUMENTS

| | | | |
|---|---|---|---|
| 1,965 | 5/1865 | Nyce . | |
| Re. 26,165 | 2/1967 | Stolz . | |
| 302,706 | 7/1884 | Brown | 212/226 |
| 518,901 | 4/1894 | Sherman . | |
| 553,119 | 1/1896 | Hunt et al. | 212/225 |
| 696,266 | 3/1902 | Beaumont | 212/226 |
| 2,388,701 | 11/1945 | Neff . | |
| 3,090,494 | 5/1963 | Thiele | 212/226 |
| 3,415,310 | 12/1968 | Kuhlman . | |
| 3,590,498 | 7/1971 | Bryant | 52/80 |
| 3,592,294 | 7/1971 | Allen | 187/12 |
| 3,958,028 | 5/1976 | Burg . | |
| 4,040,528 | 8/1977 | Hutchins | 414/564 |
| 4,066,401 | 1/1978 | Solomon . | |
| 4,078,480 | 3/1978 | Luck . | |
| 4,098,635 | 7/1978 | Hays, II et al. | 52/80 |
| 4,155,967 | 7/1979 | South et al. . | |
| 4,502,527 | 3/1985 | Brewer | 212/226 |
| 4,599,032 | 7/1986 | Haus, Jr. | 104/236 |
| 4,642,017 | 2/1987 | Fenn | 414/273 |
| 4,824,685 | 4/1989 | Bianco . | |

FOREIGN PATENT DOCUMENTS

| | | | |
|---|---|---|---|
| 781274 | 3/1968 | Canada | 187/12 |
| 870434 | 5/1971 | Canada | 414/281 |
| 2492356 | 4/1982 | France | 212/226 |
| 148623 | 6/1981 | German Democratic Rep. | 104/236 |
| 241243 | 12/1986 | German Democratic Rep. | 187/7 |
| 1197518 | 7/1970 | United Kingdom | 414/282 |

Primary Examiner—Joseph F. Peters, Jr.
Assistant Examiner—R. B. Johnson
Attorney, Agent, or Firm—Gregory O. Garmong

[57] ABSTRACT

A material handling apparatus includes a central tower having an elevated pivot point, a movable base, a support track that rests at its upper end on the central tower pivot and at its lower end on the movable base, and a trolley with hoist that moves along the support track. The apparatus can lift articles within the span of the support track and move them to other locations, by a combination of movement of the trolley and the movable base, and operation of the hoist. The crane is particularly well suited for the handling of articles and containers within domed structures.

14 Claims, 5 Drawing Sheets

5,061,148

POLAR CRANE MATERIAL HANDLING APPARATUS

BACKGROUND OF THE INVENTION

This apparatus relates to apparatus for lifting and moving articles and containers, and, more particularly, to a crane useful in storage facilities.

Storage buildings having a dome-shaped enclosure can be constructed inexpensively and quickly, in large or small sizes. The support of the structure of the building is based upon the arch principle, so that even large domes of several hundred feet diameter require no internal bracing or structure. There is a large, completely unobstructed volume that can be used for storage. A hemispherical dome shape has the further advantage that the surface area of the building is minimized for the total volume within the building, reducing heat transfer through the walls of the building. This minimization of heat transfer is important if the interior of the storage building is to be maintained at a different temperature than the outside environment.

A drawback to the use of domed storage facilities is that the space inside the dome is difficult to utilize completely and efficiently. The height of the dome is very small, approaching zero, near its periphery, and very large under the center of the dome. There is therefore unusable "dead space" near the periphery of the dome and a very high ceiling nearer the center of the dome. When access aisles are provided between the stored articles, the volume that is practically usable may be quite small.

There is therefore a need for an approach that permits better utilization of the storage space within a domed storage facility. This approach would desirably be sufficiently flexible that a wide variety of articles could be conveniently stored in the dome. The present invention fulfills this need, and further provides related advantages.

SUMMARY OF THE INVENTION

The present invention provides an apparatus which permits a high degree of utilization of the space within a domed storage facility, or other type of facility where space within a generally hemispherical volume must be used efficiently. The apparatus eliminates the need for access aisles to reach the stored articles, while utilizing a high fraction of the available floor space within the facility. The apparatus also permits articles to be stacked nonuniformly so as to best use the available storage space, where stacking is permitted. The apparatus is readily erected within the domed facility after it is constructed, and is fully controllable remotely.

In accordance with the invention, apparatus for the handling of materials comprises trolley means for moving along a support track; hoist means on the trolley for lifting materials; and trolley support means for supporting the trolley means, the trolley support means including tower means for providing a central elevated support, base means for traversing over the ground, beam means for providing a support track for the trolley means, the beam means having an upper end that is pivotably supported on the tower means and a lower end that rests upon the base means.

More specifically, crane apparatus comprises a trolley adapted for movement along a support track; a hoist on the trolley; and a trolley support, the support including a central tower having a support location thereon, a movable traversing base, and a support track for the trolley, the support track having an upper end that is pivotably supported on the support location of the central tower and a lower end that rests upon the traversing base.

The preferred crane of the invention is a "polar crane" having a support track that rests at its upper end on an elevated fixed support pivot under the center of a domed storage facility. The support track can rotate about the fixed pivot point, with its lower end moving on the traversing base. The traversing base has motor-driven traversing wheels that roll in a circumferential path at a constant radius from the pivot determined by the length and geometry of the support track. The support track is arched, approximately along an arc of a circle, so that it follows the shape of the interior wall of the domed enclosure. Of course, the polar crane could be used in other types of enclosures where the track did not follow a path along the inside wall of the enclosure.

A trolley with a hoist is movable along the support track. The trolley is close to the ground when it is furthest from the central pivot, and elevated far above the ground when it is nearest the central pivot.

With this polar crane, there remains a large open volume, unobstructed with structural supports, within the dome. The otherwise unusable space near the periphery of the dome is used for the traversing base and its path of movement. The trolley and its hoist can move articles between any other locations within the dome, except for the relatively small area reserved for the central pivot structure. No aisles for access to the stored articles are required, as the access is entirely from above. Where permitted by the nature of the stored articles, they may be stacked to a height that increases with reduced distance from the central pivot, thereby most fully utilizing the volume of the dome. The weight of the polar crane and the articles that it lifts is supported entirely by the foundation of the building and the ground, and not in any part by the domed wall. This independent support permits the use of previously known shell-type construction techniques for domed buildings.

Other features and advantages of the invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

In accordance with a preferred embodiment of the invention, crane apparatus for the handling of materials in containers comprises a stationary central tower having a support post thereon; a traversing base having traversing wheels thereon that roll over the ground, and further having a motor for controllably driving the traversing wheels; a pair of parallel arched I-beams pivotably supported at an upper end on the support post of the central tower and at a lower end on the traversing base; a pair of traction chains, one of the chains supported on each of the I-beams; a trolley having a frame, support wheels on the frame in contact with the flanges of the I-beams so that the frame can roll along the I-beam, lateral positioning wheels on the frame in contact with the webs of the I-beams to stabilize the position of the frame between the I-beams, at least two sprockets on the frame, at least one sprocket being positioned to engage each of the traction chains, and a sprocket motor that turns the sprockets to cause the trolley to move along the I-beams; and a hoist pivotably mounted to the trolley, the hoist including a lifting frame and a levelling actuator that maintains the lifting frame parallel to the ground as the trolley moves along the length of the I-beams, the hoist further including an engagement mechanism operable to engage containers to be lifted.

Figure 1:
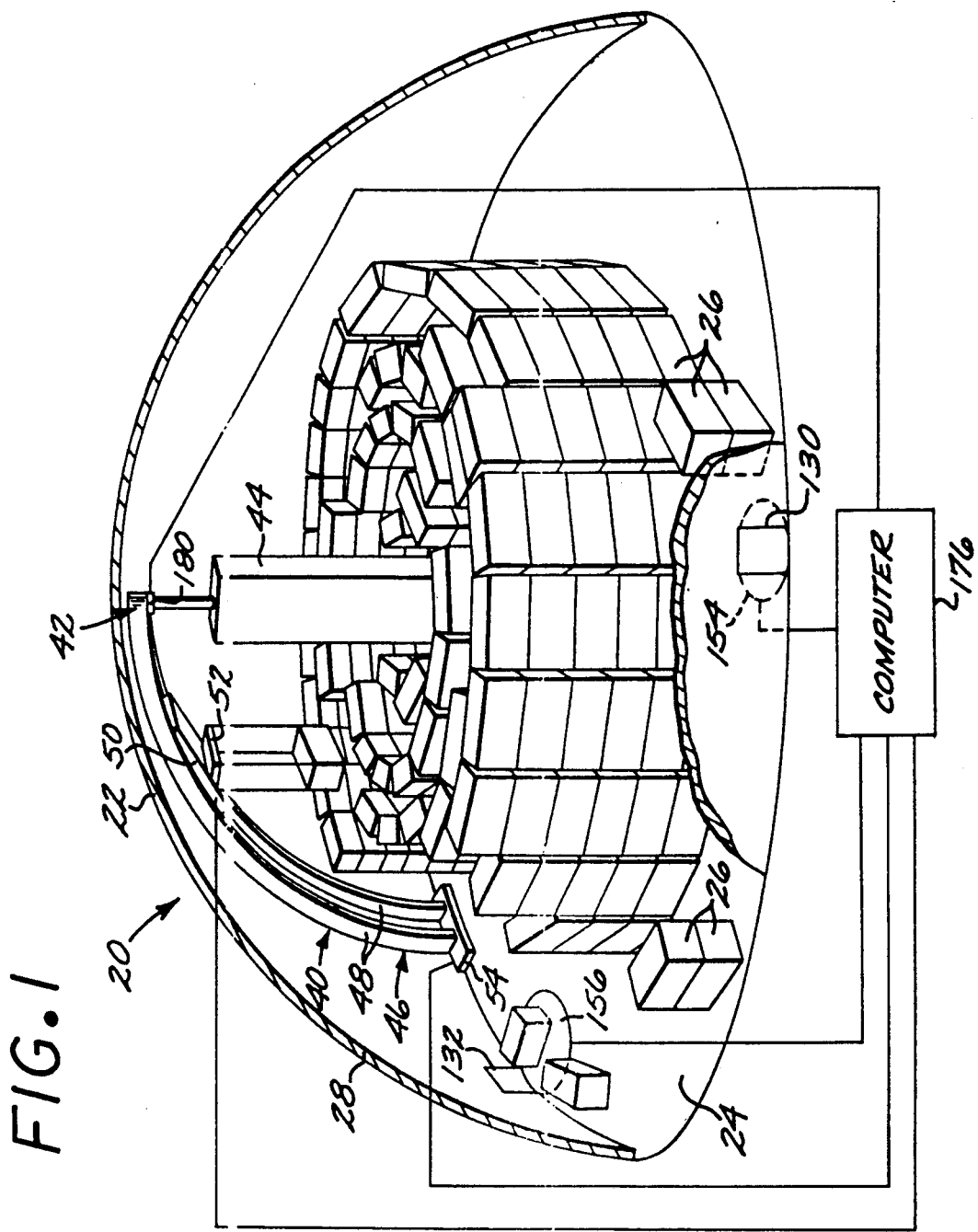
FIG. 1 is a perspective view of a domed storage facility, with portions of the wall broken away to illustrate the interior.

A domed storage facility 20 is illustrated generally in FIG. 1. In one form, such a storage facility 20 provides a controlled atmosphere and reduced temperature for the storage of agricultural produce such as, for example, apples or pears. In other forms, the storage facility could store other articles that require a controlled atmosphere, such as spare parts or antiques. More generally, the storage facility can be used for a wide variety of articles and/or containers.

The storage facility 20 has a hemispherical dome-shaped enclosure 22 that rests upon a concrete foundation 24. The enclosure 22 is large enough to contain a plurality of storage containers 26. In one embodiment in which the polar crane of the invention has been constructed and tested, the storage containers 26 illustrated in FIG. 1 are 8 feet wide, 8 feet high, and 17 feet long, and can each hold about 25,000 pounds of apples. The enclosure 22 is about 115 feet high, 230 feet in diameter at the base, and has the capacity to store about 1000 of the containers 26 stacked in the manner illustrated in FIG. 1.

The outer surface of a wall 28 of the enclosure 22 includes a layer of a gas barrier material such as canvas coated with plastic, the layer being about 0.95 inches thick. Interior to the layer is an insulation layer formed of polyurethane foam about 5 inches thick. A plurality of reinforcement bar hangers are anchored within the insulation layer and project inwardly from its interior surface. A network of steel reinforcement bars are fastened to the interior ends of the hangers. A layer of concrete such as shotcrete or gunnite encloses the network of reinforcement bars, the layer ranging from about 4—½ inches thick at the top of the dome to about 8 inches thick at the base of the dome.

The enclosure 22 is constructed by first furnishing and inflating a substantially hemispherical air form made of the material of the layer. The insulation layer is sprayed over the interior of the air form. As the insulation layer is gradually built up in thickness by repeated passes of a spray apparatus, the hangers are fixed in place with the insulation sprayed around them. After the layer is complete, the network of reinforcing bars is fastened to the interior end of the hangers. The network is positioned so that it is within the concrete layer that is sprayed over the interior of the insulation layer.

This construction technique and building form have been known previously, see, for example, U.S. Pat. Nos. 4,155,967 and 4,324,074, whose disclosures are incorporated by reference. Such domed enclosures are constructed by Monolithic Constructors, Idaho Falls, Id. The enclosure 22 made by this technique is well suited for use in a controlled atmosphere dome because it is gas impermeable, has no seams where gas leaks might develop over time, is resistant to wind loadings, is seismically stable, has a low surface-to-volume ratio to minimize heat loss from the reduced temperature interior, and is inexpensive to construct for its size. However, the domed enclosure is not well adapted for storing large numbers of rectilinear containers, unless special attention is given to the problem of optimizing the stacking of containers within the enclosure.

To achieve full utilization of the space within the interior of the dome-shaped enclosure, a polar crane 40 is utilized. The polar crane 40 is a bridge-type crane that is supported at an upper end 42 upon a central tower 44, and at a lower end 46 upon the foundation 24. A pair of curved beams 48 extends from the upper end 42 to the lower end 46. Each of the beams 48 has a cross section of an I-beam with a web and upper and lower flanges. The shape of the beams 48 generally follows, but is spaced apart from, the wall 28 of the enclosure 22. That is, the I-beams are shaped longitudinally approximately as arcs of a circle having a radius slightly less than the radius of the hemispherical enclosure.

A trolley 50 rides on the beams 48 and can move between the lower end 46 and the upper end 42. The trolley 50 includes a hoist 52 that hooks to a container 26, lifts the container 26 up, and later lowers the container 26 to a selected position. The crane 40 can move containers 26 to any location within the enclosure 22, by rotating the beams 48 and thence the entire polar crane 40 about the tower 44, and moving the trolley up or down the beams 48.

The polar crane 40 permits containers to be moved between any locations within the enclosure 22. The containers 26 are conveniently stacked to substantial heights, up to about 10 containers high in the preferred embodiment. No aisles between the stacks are required or provided, greatly increasing the efficiency of space utilization. If a container is to be removed from the bottom of the stack, unstacking and restacking is required, but a temporary buffer stacking area is provided for this purpose. As will be described, in the preferred embodiment inventory control is maintained by a computer, so that each container can be readily traced.

Figure 2:
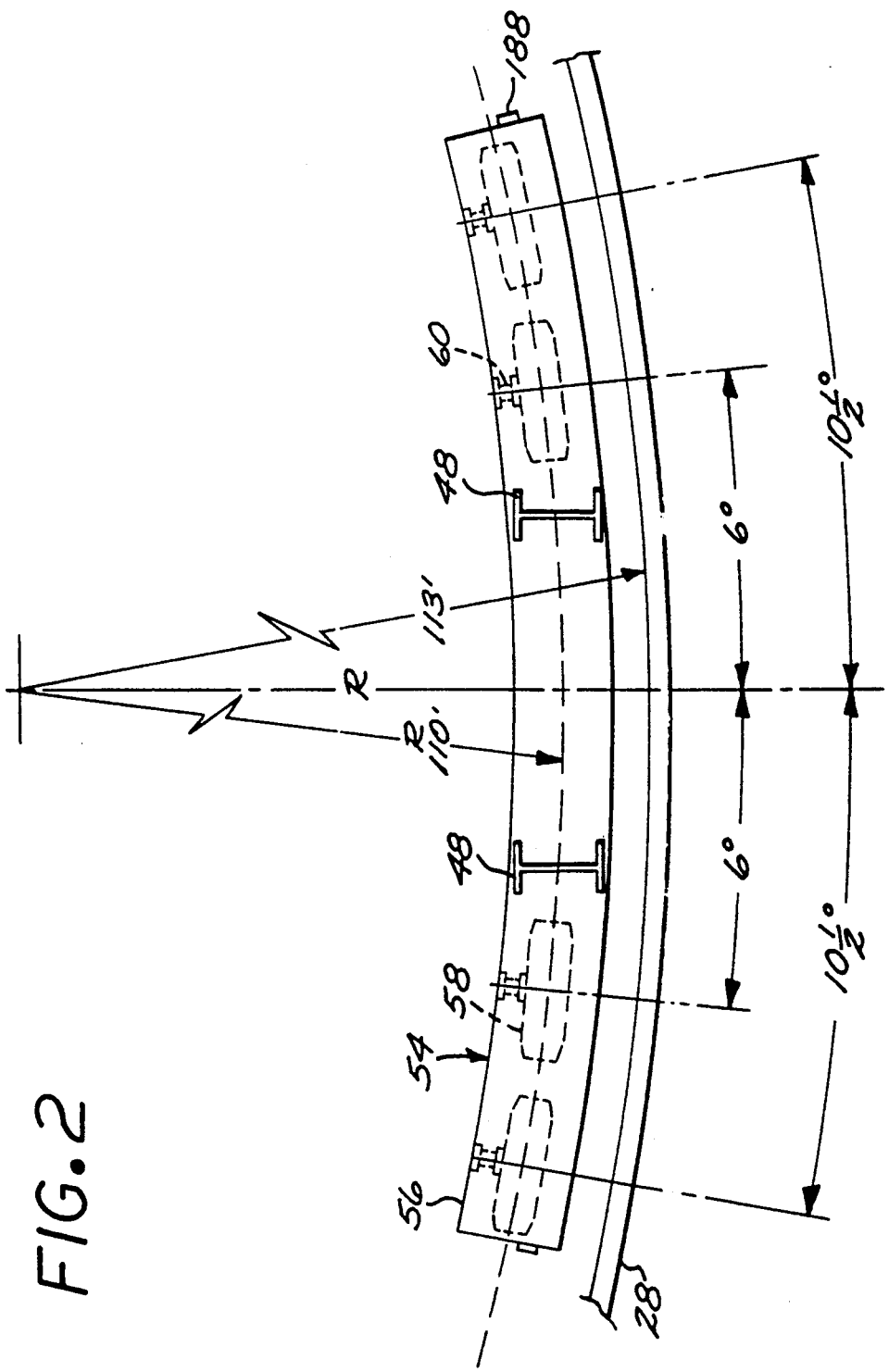
FIG. 2 is a plan view of the traversing drive of the polar crane.

FIG. 2 illustrates a lateral traversing mechanism 54 at the lower end 46 of the polar crane 40. The traversing mechanism 54 supports the lower end 46 of the beams 48 on a base 56 that rides along the foundation on four large pneumatic rubber tires 58. The axles of the wheels on which the tires 58 are supported are oriented radially, so that the tires 58 naturally roll along a circumference of a circle just inside the wall 28 of the enclosure 22. In the most preferred embodiment, the radius of the wall 28 at the location where it rests upon the foundation 24 is about 113 feet. The tires 58 roll along a circular path of radius about 110 feet. Each tire 58 is independently driven by its own hydraulic motor 60.

Figure 3:
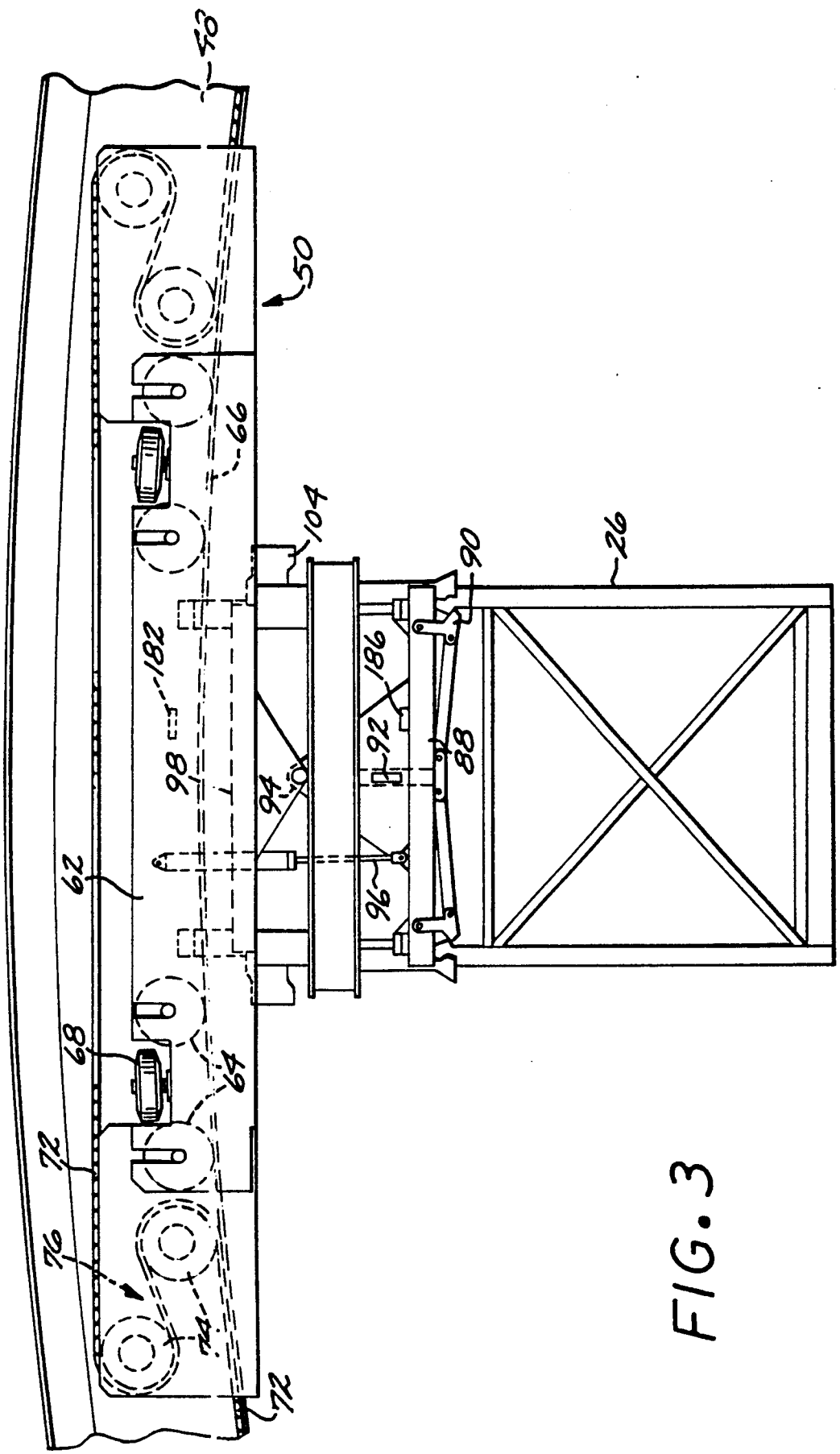
FIG. 3 is a side elevational view of the trolley of the polar crane.
Figure 4:
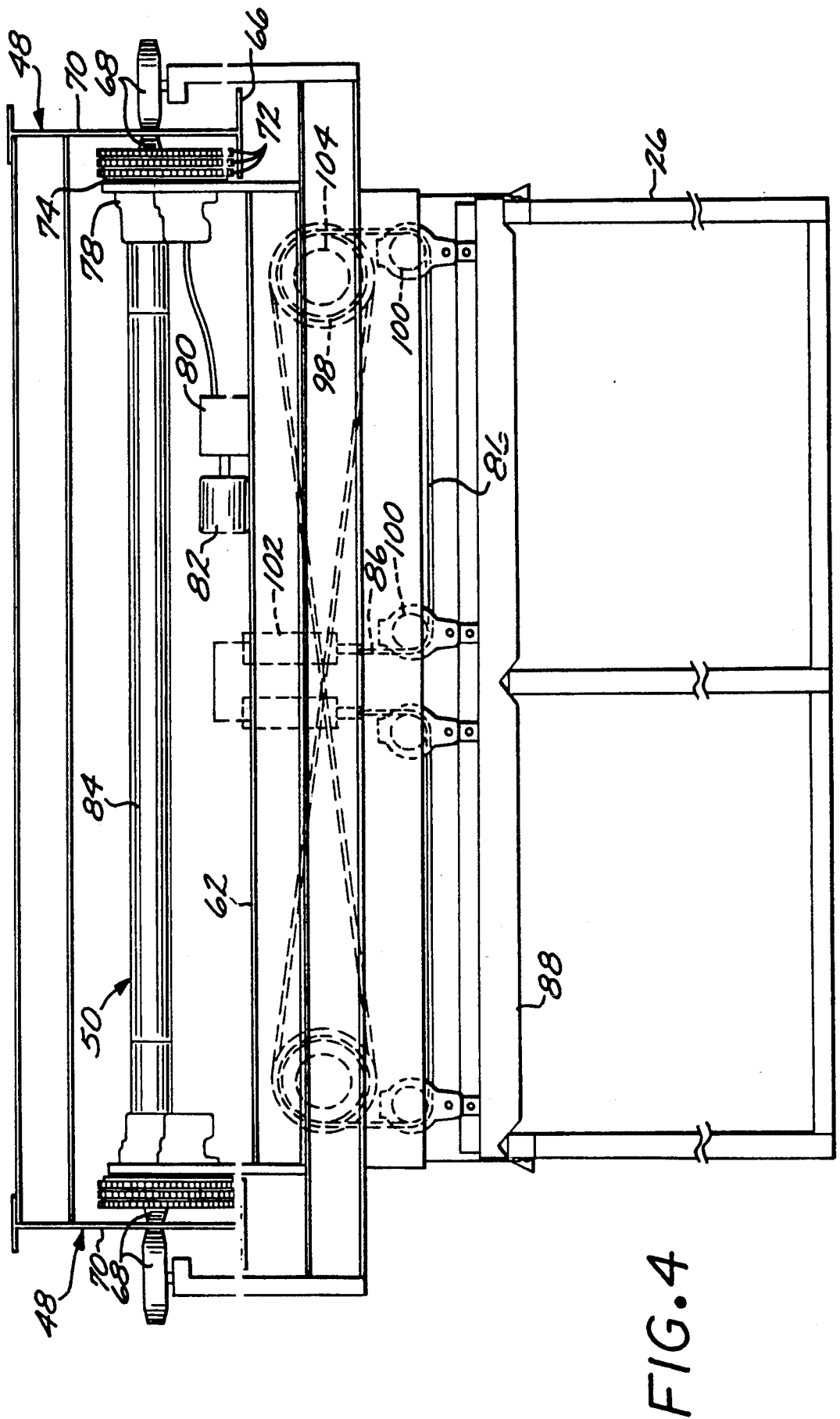
FIG. 4 is an end elevational view of the trolley of the polar crane.
Figure 5:
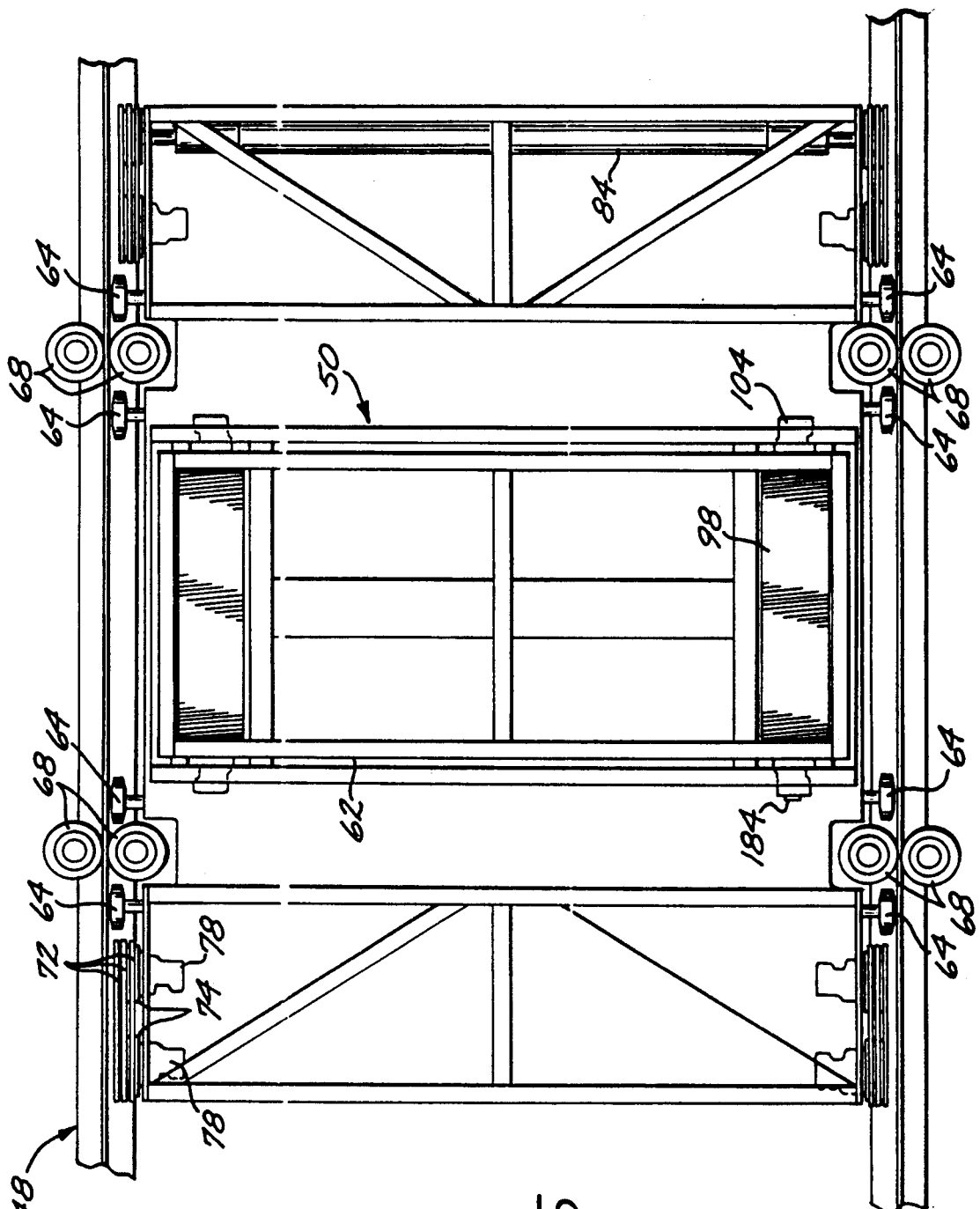
FIG. 5 is a top plan view of the trolley of the polar crane.

The trolley 50 and associated hoist 52 are illustrated in more detail in FIGS. 3–5. The trolley 50 includes a frame 62 that supports the active components of the trolley. Eight support wheels 64 are attached to the sides of the frame 62 to ride upon a lower flange 66 of each beam 48. The weight of the frame, the hoist, and the supported load are carried through the support wheels 64.

Four pairs of lateral positioning wheels 68 are attached to the frame 62 with their axles oriented perpendicular to the lower flange 66 of the beams 48. Each pair of the lateral positioning wheels 68 captures the web 70 of one of the beams 48 therebetween in the manner best illustrated in FIG. 5. The lateral positioning wheels 68 locate the frame 62 between the beams 48. All of the wheels 64 and 68 are preferably made of solid rubber.

The firm grasping of the two beams 48 by the frame 62 plays a role in maintaining the structural rigidity of the polar crane 40. The rigid frame 62 of the trolley 50 resists twisting motions that otherwise might deform the beams 48 beyond that permissible. That is, the frame 62 acts as a movable stiffening element for the polar crane 40.

The trolley 50 moves along the beams 48 by crawling along a pair of stationary chains 72. The chains 72 extend between the upper end 42 and the lower end 46 of the beams 48, with one chain 72 lying along the interior side of the lower flange 66, as best shown in FIGS. 3 and 4. Four pairs of sprocket drive wheels 74 are supported on the trolley 50, two pairs at each end. On each side of the frame 62, the chain 72 is passed over the two sprocket drive wheels 74 in an S-shaped curve, as indicated by numeral 76 in FIG. 3. The sprocket drive wheels 74 thereby engage the frame 62 to the chain 72.

Each sprocket drive wheel 74 is independently driven by a hydraulic motor 78. The pressurized fluid for each motor 78 is supplied by a hydraulic power supply 80, which in turn is driven by an electric motor 82. To ensure that the left and right sides of the trolley 50 are driven at the same speed up or down the beams 48, a synchronization shaft 84 is connected between two opposing sprocket drive wheels 74 on the opposite sides of the frame 62. These two synchronized sprocket drive wheels cannot turn at different rates due to the synchronization shaft 84. Because all of the sprocket drive wheels on each side of the frame must turn at the same rate due to the synchronizing effect of the chain, the lateral synchronization of just one pair of sprocket drive wheels by the synchronization shaft 84 ensures that the trolley 50 must move along the beams uniformly.

The hoist 52 is mounted to the frame 62 of the trolley 50. The hoist 52 includes cables 86 that mount to a lifting frame 88, which in turn attaches to the top of the container 26 with hooks 90. To lift a container 26, the lifting frame 88 is attached to the container 26 and the hoist 52 is operated. A motor 92 causes the hooks 90 to retract when the container 26 is to be released.

The lifting frame 88 must be maintained level with the earth, regardless of how high the trolley moves up or down the beams 48. Otherwise, the articles being moved may be spilled or may be impossible to stack properly. The lifting frame 88 is pivotably supported from the trolley frame 62 by a pivot rod 96 that extends transversely to the beams 48. The lifting frame 88 is pivoted about the pivot rod 94 by and maintained level with respect to the earth by the operation of a hydraulic levelling piston 94 attached between the trolley frame 62 and the lifting frame 88.

The four lifting cables 86 at the four corners of the lifting frame 88 are independently wound around two pairs of cable drums 98. The cables 86 pass over pairs of pulleys 100 attached to the top of the lifting frame 88, and to slack takeup pistons 102 on the underside of the trolley frame 50. A motor 104 drives each cable drum 98 to wind or unwind cable. When the lifting frame 88 is raised to its uppermost position tight against the underside of the trolley frame 62, any slack in one or more of the cables 86 is removed by operation of its slack takeup piston 102.

Containers enter the enclosure 22 through an entry port 130, and leave through an exit port 132 (which may be combined as a single entry/exit port). Adjacent the entry port 130 is an entry turntable 154, and adjacent the exit port 132 is an exit turntable 156. The turntables 154 and 156 permit containers 26 to be reoriented within the enclosure so that they can be grasped by the hoist mechanism, if such reorientation is required.

A controller 176, which is preferably a programmed microprocessor, controls the operation of the polar crane 40 (and can also be programmed to control other aspects of the storage facility 20 such as environmental control). The controller 176 also keeps track of the location of each particular container or article that is stored, so that it can be recalled upon request.

The controller 176 receives a signal indicative of the circumferential position of the polar crane from a rotary position encoder 180 located on the pivot at the top of the tower 44. The 360 degrees about the tower are divided into increments, and the exact lateral position of the polar crane 40 is indicated by the measurement of the encoder 180.

The controller receives sensor inputs from sensors mounted on the trolley 50. These inputs include encoder measurements that indicate the position of the trolley along the beams 48, encoder measurements 184 that count rotations of the cable drums 98, a bar code reader that senses the identity of the container 26, a level indicator 186 that senses the tilt of the lifting frame 88, strain gauges on each cable, limit switches for the movement of the trolley and the hoist, and a hydraulic leak detector. There is also preferably at least one television camera and associated lighting on the trolley 50.

The controller 176 receives sensor inputs from the base 56 and traversing mechanism 54, including obstruction detectors 188 that prevent the base 56 from running into objects, a distance movement encoder, and a hydraulic leak detector.

The controller 176 provides control outputs to the polar crane, including motors 60, 78, 82, 92, and 104, to achieve precise movement and positioning of a container 26.

A storage facility as described herein has been constructed and placed into operation to ascertain its operating parameters. The containers that hold the produce are about 8 feet high, 8 feet wide, and 17 feet long. Each container holds about 25,000 pounds of apples. The domed enclosure of the storage facility is 115 feet high and about 230 feet in diameter at the base. The containers are routinely positioned with a tolerance of $+/-\frac{1}{4}$ inch, and have been stacked up to 10 high without mishap.

The polar crane of the invention permits the space within domed storage facilities to be utilized much more efficiently than with prior materials handling systems. Although particular embodiments of the invention have been described in detail for purposes of illustration, various modifications may be made without departing from the spirit and scope of the invention. Accordingly, the invention is not to be limited except as by the appended claims.

What is claimed is:

1. A crane apparatus for use within a generally hemispherical dome-shaped storage enclosure with a load support surface and crane apparatus located therein, comprising:

a trolley support, the support including a stationary tower with a support post thereon centrally located in the enclosure;

a movable traversing base, with means for controllably moving the base to selected positions within the enclosure;

parallel arched beams joined together to form a trolley support track, the arched shaped beams being generally shaped in the longitudinal direction as arcs of a circle having a radius slightly less than the radius of the hemispherical enclosure, the support track having an upper end that is pivotally supported on the support post of the central tower and a lower end that rests on the traversing base;

a trolley having support means thereon that moves along the support track;

means for moving the trolley along the support track between the upper and lower ends; and a hoist on the trolley, the hoist including engaging means for engaging a load to be lifted thereby and means for maintaining the engaging means substantially level relative to the load support surface in the enclosure.

2. The apparatus of claim 1, wherein the support track includes two beams.

3. The apparatus of claim 1, wherein the support track comprises two parallel I-beams.

4. The apparatus of claim 1, wherein the trolley has a motor thereon that supplies the power for movement along the support track.

5. The apparatus of claim 1, wherein the hoist includes a levelling mechanism that maintains at least a portion of the hoist level relative to the ground.

6. The apparatus of claim 1, wherein the traversing base includes a motor that propels its movement.

7. The apparatus of claim 1, wherein the beams are I-beams, and the support wheels of the trolley roll along the lower flange of the I-beams.

8. The apparatus of claim 7, wherein the trolley further has lateral positioning wheels that contact the webs of the I-beams and maintain the position of the trolley relative to the I-beams.

9. The apparatus of claim 1, wherein the means for moving includes a traction chain lying along the beams and a driven sprocket on the trolley that engages the traction chain.

10. The apparatus of claim 1, wherein the base has at least one wheel thereon, and a motor that drives the wheel.

11. Crane apparatus for the handling of materials in containers, comprising:

a stationery central tower having a support post thereon;

a traversing base having traversing wheels thereon that roll over the ground, and further having a motor for controllably driving the traversing wheels;

a pair of parallel arched I-beams pivotably supported at an upper end on the support post of the central tower and at a lower end on the traversing base;

a pair of traction chains, one of the chains supported on each of the I-beams;

a trolley having
       a frame,
       support wheels on the frame in contact with the flanges of the I-beams so that the frame can roll along the I-beam,
       lateral positioning wheels on the frame in contact with the webs of the I-beams to stabilize the position of the frame between the I-beams,
       at least two sprockets on the frame, at least one sprocket being positioned to engage each of the traction chains, and
       a sprocket motor that turns the sprockets to cause the trolley to move along the I-beams; and a hoist pivotably mounted to the trolley, the hoist including a lifting frame and a levelling actuator that maintains the lifting frame parallel to the ground as the trolley moves along the length of the I-beams, the hoist further including an engagement mechanism operable to engage containers to be lifted.

12. The apparatus of claim 11, further including a computer that controls the movement of the traversing base, the sprocket motor, and the hoist.

13. The apparatus of claim 11, further including a turntable on the ground for orienting containers for engagement by the engagement mechanism.

14. The apparatus of claim 11, further including a synchronization shaft extending between two of the sprockets.

* * * * *